United States Patent [19]

Krampe

[11] Patent Number: 5,469,762
[45] Date of Patent: Nov. 28, 1995

[54] DEVICE FOR STRIPPING ELECTRIC CONDUCTORS AND/OR WIRES

[76] Inventor: Franz Krampe, Bergstrasse 5,, D-49387 Ascheberg-Herbern, Germany

[21] Appl. No.: 204,158
[22] PCT Filed: Jul. 1, 1993
[86] PCT No.: PCT/EP93/01695
  § 371 Date: Jul. 18, 1994
  § 102(e) Date: Jul. 18, 1994
[87] PCT Pub. No.: WO94/01906
  PCT Pub. Date: Jan. 20, 1994

[30] Foreign Application Priority Data

Jul. 2, 1992 [DE] Germany .............. 42 21 500.5

[51] Int. Cl.⁶ .................................................. H02G 1/12
[52] U.S. Cl. ................................ 81/9.43; 81/9.4; 30/90.1
[58] Field of Search ................ 81/9.4–9.44; 30/90.1, 30/91.2

[56] References Cited

U.S. PATENT DOCUMENTS 3,125,908  3/1964  Rozmus .
4,341,134  7/1982  Yamazaki et al. ............. 81/9.41
4,377,954  3/1983  Schulze ........................ 81/9.43
4,557,164  12/1985  Krampe ........................ 81/9.41
5,131,299  7/1992  Krampe ........................ 81/9.43

FOREIGN PATENT DOCUMENTS 792055  3/1958  United Kingdom .

*Primary Examiner*—James G. Smith
*Attorney, Agent, or Firm*—Karl F. Milde, Jr.

[57] ABSTRACT

In order to allow conductors or wires having different cross sections to be easily and reliably stripped, the swivelling axis pin of a stripper is designed as a double axis pin whose first substantially cylindrical pivot is arranged in a first leg and whose second substantially cylindrical pivot is arranged in a second leg. Both pivots are held and guided in an intermediate element. This sliding hinge allows both legs with their cutting tool parts to be held as forceps and to be pressed against each other and slid in one direction with respect to each other by actuating guiding elements arranged on the legs.

18 Claims, 5 Drawing Sheets

DEVICE FOR STRIPPING ELECTRIC CONDUCTORS AND/OR WIRES

The invention concerns a device for the purpose of stripping insulation from electrical conductors and/or wires, that consists of at least two legs forming a stripping device, such that at one of their ends the legs have at least one swivelling axis pin, with which the legs can be closed, and at least in the area of their other ends they have at least one cutting tool part.

A device for the stripping of electrical conductors and/or wires is known from DD 248 003 A1. In that device, two legs are arranged opposing each other, that have cutting tool parts at their forward ends and are made closable by a swivelling axis pin at their rear end. Connected to the swivelling axis pin is a third leg, that is in turn connected with the forward leg and with the cutting tool parts by an angle arm.

When the third leg is activated, the cutting tool parts are pressed together so as to cut through the insulation. When they are pressed together for a second time, the cutting tool parts are pulled backwards by the angle arm. Clamps arranged in front of the cutting tool parts hold the conductor in fixed position. This double action of cutting and removing the insulation can damage the conductor if the pressure applied varies while the insulation is being pulled away. Indeed, the cutting tool parts, which are arranged as sheering blades, can damage larger-diameter conductors so severely that the conductor may break during the subsequent processing, or may be cut completely through during the stripping procedure. There is a further disadvantage in that the user's finger can be caught in the action of the three contiguous legs and the intermediate angle arm.

A device for the stripping of electrical conductors and/or wires is known from DE 36 32 685 C2. It consists of two pairs of legs that move about a swivelling axis pin. The shorter pair of legs is designed as a wire cutter. Conductors and wires can be cut into specified lengths with the help of the longer pair of legs of these pliers, which then perform the function of hand-grips. The longer legs can be used furthermore as a stripping device. In this case a locking device prevents the two operating legs from swinging open accidentally.

Although conductors and wires can be stripped by applying the cutting tool parts on the inner sides of the operating legs, this procedure is essentially limited to the cutting of insulation on conductors or wires that are round in shape. During the subsequent removal of the insulation, the wire cutter located on the opposite side is partially retracted. Should the pair of legs open unintentionally, there is the danger of injury from the cutting tool parts thus exposed.

The invention has as its purpose the further development of the device named at the outset for stripping electrical conductors and wires, so as to enable the easy and safe stripping of conductors and wires of varying cross section.

This purpose is achieved in accordance with the invention, by doubling the swivelling axis pin so that the two opposing legs with their cutting tool parts are arranged as forceps and, by means of the guiding elements arranged on them, can be slid in contrary motion against each other after being pressed together.

The advantages realized with the invention consist in particular in that the legs are arranged against each other as forceps, and thus allow the conductor or wire to be gripped securely and safely.

In the following explanation, conductor means a single or multi-strand conducting wire surrounded with insulation, made of copper, aluminum or similar material, wire means one or more conductors with a sheathing made of an insulating material e.g. plastic, rubber, specialized paper or similar material.

Since cables and wires have substantially the same construction, the stripping device described is also applicable for cables.

After the wire is gripped, the surrounding sheathing can be cut through and pulled off. The insulation on the individual conductors thus exposed can now also be safely cut through. The doubling of the swivelling axis pin transforms the gripping motion into a sheering motion so that with one pressing together of the two legs, the insulation on the conductor is cut through and subsequently removed.

In a further embodiment of the invention, and going beyond the double mounting of the swivelling axis pin, in addition to the cutting tools of a known insulation stripping tool and/or of a known sheathing stripping tool for round conductors, cutting tools of an insulation stripping tool for flat conductors and wires and/or gripping jaws can be mounted on the inner sides of the legs, which cutting tools are L-shaped and are offset against each other with respect to the direction of sliding by 180°.

This possibility for making use of known and new tools creates a universally applicable stripping device. The arrangement of the gripping jaws in front of the cutting tools of the conductor stripping tool, and the double motion of the legs, ensure a simple and easy stripping operation. The L-shaped cutting tools that are arranged offset to each other at 180° can be used to particular advantage for cutting flat conductors. This is because when the cutting tools arranged in the lengthwise direction of the legs are pressed and slid, the insulation of the flat conductor is cut through on top and in particular on the sides. The insulation is thus cut through all around, and can then be pulled off.

It is an advantage that at the double mounting of the swivelling axis pin a hooked extension to one of the legs is arranged, whereby a blade element can be guided back and forth with the sliding motion.

The concealed blade element makes it possible to cut through and remove any outer insulation properly. Above all, protection is provided against accidental injury because the knife is only exposed when the leg is slid. By pushing the conductor into the hooked extension and pressing the blade against the insulation, this special cutting device will function perfectly.

It is an advantage that the double mounting of the swivelling axis pin is designed as a double hinge, whereby both legs are connected to each other by an intermediate element that is pivotally mounted on each leg.

The intermediate element thus holds the two legs together. When activated, one of the leg mountings moves first, and then the other mounting, so that the cutting action becomes a sliding action.

It is an advantage in this case that the pivotally mounted intermediate element is provided with a return element, e.g. a spring and a return stop element, that is arranged on at least one of the legs.

This ensures that after activation the two legs always return by themselves to the same starting position and are thus ready for activation again.

It is also possible to design the double mounting of the swivelling axis pin as a sliding element, that moves in at least one slot arranged in or between the legs.

The sliding element can in this way consist of one complete and two partial pivots, or two ball bearings, that can be moved across an intermediate bridge in the slots by a multi-stage spring.

Such a solution is described in detail in DE 32 41 530 C2. The application of this solution whereby a common swivelling and sliding point causes first the gripping and then the sliding motion by the sliding element moving in the grooves, represents a further possible form of adaptation for a double pivot mounting, and is thus an advantageous integration of the slot principle in a forceps-type stripping device.

In a further embodiment of the invention, the guide element is at the same time a stop element for the conductor as it is fed into the stripping tool and the gripping jaws.

This double function of the guide element makes it possible always to remove the same length of insulation from all conductors to be stripped. This means that terminal connections for any application will have a uniform appearance and can be properly installed.

It is an advantage if the guide element is designed as at least one pin, inserted in or installed on the inner side of one of the legs and sliding in at least one longitudinal recess.

This ensures that the two legs always move parallel to each other, and avoids any distortion of the cutting tools and the gripping jaws during stripping.

This advantageous effect can also be achieved by designing the guide element as a lever hinge that is hinged to one of the legs and is guided within a slot on the other leg. In this way, not only are the legs guided but the greater force necessary for stripping is achieved.

This increased force can be achieved if in the preferred manner a lever, arranged on one articulation of the lever hinge, has a curved surface such that during the sliding motion of the two legs it comes into forceable contact with a cylindrical roller arranged in the slot. Above all, as the curved surface slides past the roller, this reinforces both the cutting and the sliding action. Depending on how this curvature is designed, both actions can be reinforced variably and/or continuously, as desired.

A reinforcement of the necessary stripping motion can also be achieved if in the preferred manner a v-shaped lever held in the slot engages from below, through forcible contact with its substantially straight part, a cylindrical pivot turning in a socket, with the lever and the socket arranged on one of the legs. By engaging beneath the rotationally mounted cylindrical pivot, the straight part of the v-shaped lever reinforces the cutting and sliding motion, the strength of which is determined by the angle of inclination of the straight part. As with the previous action-reinforcing device, this one is especially suited for the stripping of larger-diameter conductors.

It is advantageous if the intermediate part is arranged at an angle of between 30° and 90° to one of the legs. This inclination of the intermediate part contributes in the same way to strengthening the force of the individual motions. Above all, a sloping intermediate part strengthens the sliding motion.

It is advantageous to design the return stop element as a cylindrical pivot running in recessed grooves in one of the legs, and held by an arm, as a fixed backstop in one of the mounting points and/or as an adjustable stop arranged on one of the legs.

The stopping function thus provided ensures that both legs are always mounted to each other in a secure and fixed working position.

It is advantageous to arrange the blade element on a piston bolt that is connected to an arm and that is guided by a pin of one of the pivot mountings in a slot in the piston bolt. This ensures a problem-free use of the blade element in combination with the hook-shaped extension, and also represents one application of the return stop.

It is advantageous if at least one of the legs is provided with a raised grip on its outer side, which (if there are two) lie directly opposite each other or offset to one another. The special gripping ability that this permits will make the stripping device easier to use.

The illustrations provide sample embodiments of the invention, as described in more detail below. They show:

FIG. 1a an insulation stripping device for conductors and round as well as flat wires shown diagrammatically in perspective, FIG. 1b a stripping device in accordance with FIG. 1a shown diagrammatically in cross-section, FIG. 1c a stripping device in accordance with FIG. 1a shown from the front diagrammatically, FIG. 2a a stripping device for conductors and round wires shown diagrammatically in perspective FIG. 2b a stripping device in accordance with FIG. 2a shown diagrammatically in cross section, FIG. 2c a stripping device in accordance with FIG. 2a seen from the front, in diagram form, rotated through 180°, FIG. 3a a stripping device for larger-diameter conductors shown diagrammatically in perspective, FIG. 3b a stripping device in accordance with FIG. 3a shown diagrammatically in cross section, FIG. 3c a stripping device in accordance with FIG. 3a seen diagrammatically from the front, FIG. 4a a further embodiment of a stripping device for larger-diameter conductors shown diagrammatically in perspective, FIG. 4b a stripping device in accordance with FIG. 4a shown diagrammatically in cross section.

Figure 1A:
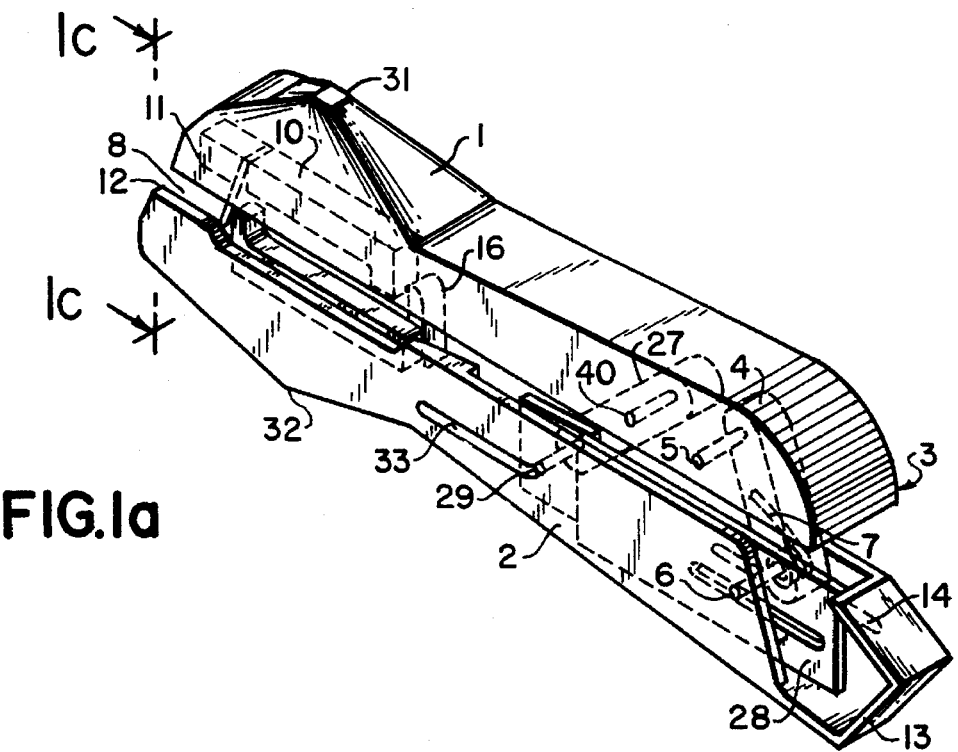
Figure 1B:
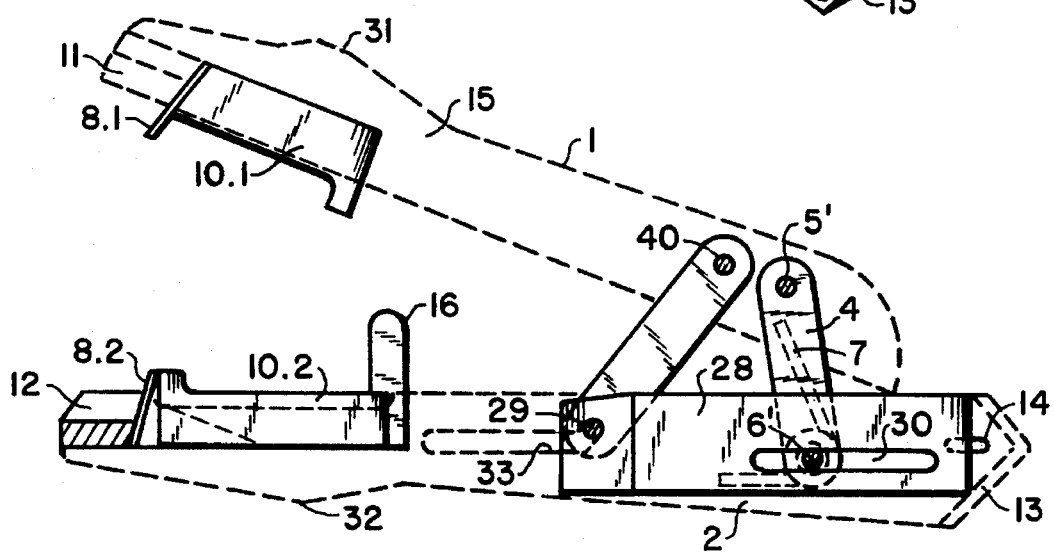
Figure 1C:
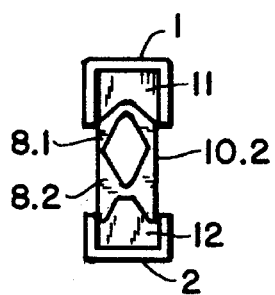

A stripping device for conductors and round as well as flat wires in shown in FIGS. 1a to 1c.

As can be seen particularly clearly from FIG. 1a, the device has forceps-like legs 1 and 2 lying essentially parallel and facing each other with a double hinge 3 positioned between them. The double hinge 3 consists of an intermediate part 4, that is held at the upper leg 1 in a pivot mounting 5 and in the lower leg 2 in another pivot mounting 6. The intermediate part is preferably rectangular, but may also be round or oval-shaped. In the outer surface, or in one of the outer surfaces, of the intermediate piece 4 a spring 7 is inserted, that can be held in the vicinity of the mounting 6, e.g. at an inner side of the lower leg 2.

The lower leg 2 is extended at this end in a hook-shaped extension 13. A piston bolt 28 strikes against the inner surface of the extension 13. The piston bolt 28 is likewise preferably rectangular in shape, but can also have another shape. In the piston bolt 28 there is a slot 30. The pivot of the lower mounting 6 goes through this slot 30, as shown in FIG. 1b. At the opposite end from the blade element 14 is an arm 27 fastened to a pin 29. The pin itself is guided in at least one slot 33 that has the shape of a horizontal "1". The arm 27 is held at the upper leg 1 by a continuous pivot mounting 40. The arm itself also preferably has a rectangular shape, although another shape is possible. However, the rectangular shape of the intermediate piece 4, the arm 27 and the piston bolt 28 produces the advantage, first, that all three elements can move without hindrance in hollow U-shaped sections of the legs 1 and 2, and second, that when the legs 1 and 2 are activated this provides reciprocal guidance. The respective U-shaped hollow leg sections extend for about one half the length of the leg 1 or 2. In this area a peg 16 is arranged on the lower leg 2, for which a compatible recess 15 is provided in the upper leg 1.

Figure 3A:
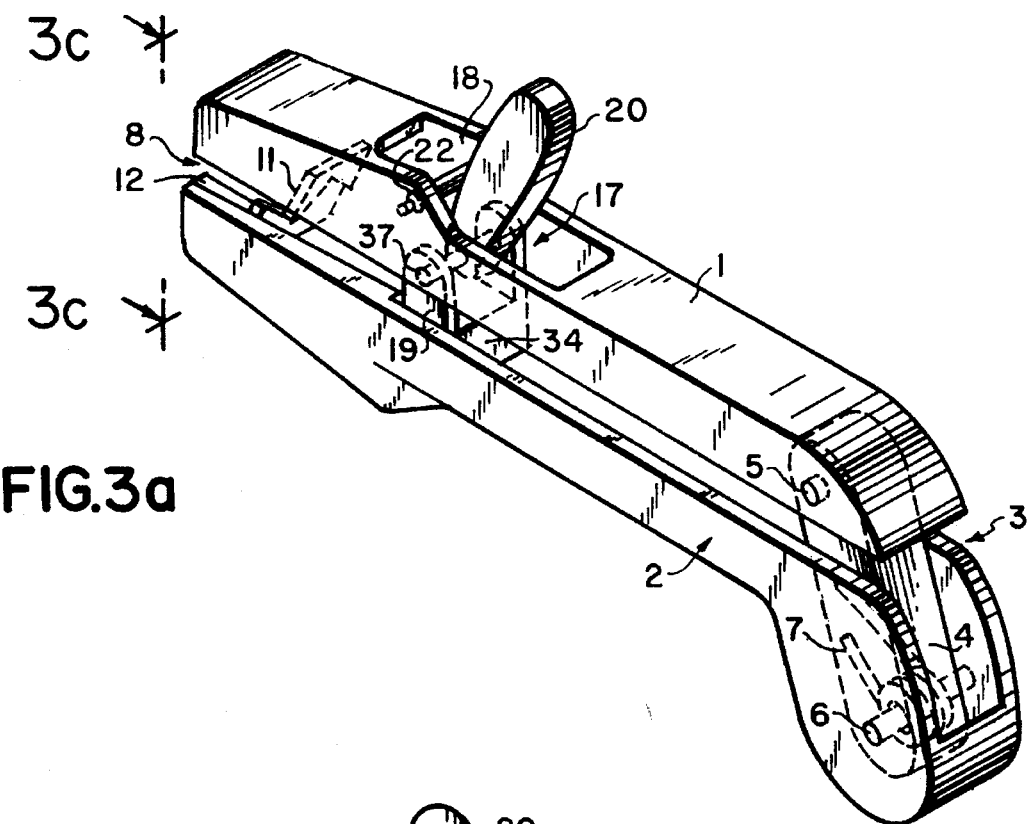
Figure 3B:
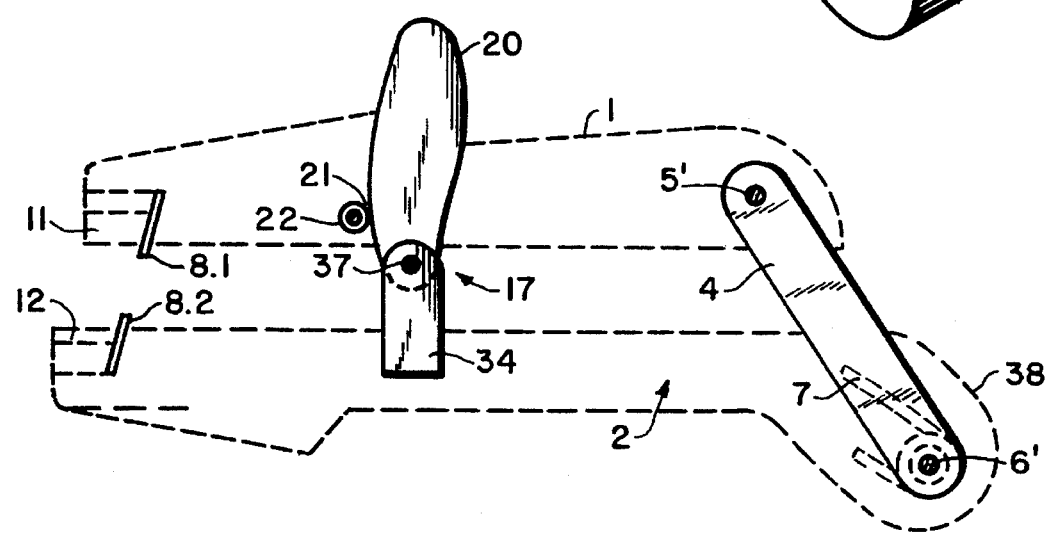

At the forward end of both legs 1 and 2 is a tool 8 for stripping conductor insulation. One of its cutting blades 8.1 is fastened to the upper leg 1, and its other cutting blade 8.2 is fastened to the lower leg 2. Both cutters 8.1 and 8.2 are tilted with respect to the longitudinal axis of the respective leg, with the cutter 8.1 tilted forward and cutter 8.2 tilted backward. Their edges are, as FIG. 3b shows clearly, sloped downward from the outside towards the middle in the shape of an open triangle with opposing points. In front of the cutting blade 8.1 is a similarly shaped gripping jaw 12, that is roughly congruent in its shape with the gripping jaw 11.

Between the peg 16 and the cutting blade 8.2, the L-shaped cutting blade 10.2 of a sheath-stripping tool for flat conductors and wires is arranged. A further cutting blade 10.1 of this tool is fastened opposite on the upper leg behind the cutting blade 8.1. It is reversed by 180° and thus has an inverted L shape.

To make for easier operation, both legs 1 and 2 are equipped with raised grips 31 and 32. These two raised grips 31 and 32 lie roughly opposite each other, as FIG. 1a shows. They can however also be arranged offset to one another. In front of the raised grip 31 and behind the raised grip 32 there are thus additional gripping recesses available.

If a conductor is now pushed forward into the conductor stripping tool, it strikes against the peg 16. The pressing together of the legs 1 and 2 causes the cutting blades 8.1 and 8.2 to grip the insulation of the conductor and cut it through. During this pressing together, the upper leg 1 inclines towards the lower leg 2 and pushes the pin 29 from its resting position in the recessed groove 33. If the two legs 1 and 2 are then pressed harder together, the cutting and gripping motion is transformed by the double hinge 3 into a sliding motion. This sliding motion is facilitated by the pin 29 sliding in the recessed groove 33 and the somewhat forward leaning intermediate part 4, which because of the mountings 5 and 6 takes on a yet more tilted position. During this sliding motion the gripping jaw 11 also slides over the gripping jaw 12 and with the help of the two cutting blades 8.1 and 8.2 pushes the split insulation off so that the bare conductor or the bare wire bundles are available for a further application.

If the sheathing of a round wire is to be stripped, as described above, the two legs 1 and 2 are slid against each other. In the now open hook-shaped extension 13 a round conductor is inserted cross-wise to the leg's axis and by loosening the grip the blade element 14 is applied to the sheathing. As it is rotated, the sheathing is cut through and can then be pulled away.

If a flat conductor is to be stripped, this is likewise inserted across the axis of the legs in the tool 10 between the two legs 1 and 2. When the legs are pressed together the insulation on the flat side of the conductor or wire is cut through. As the two legs 1 and 2 pass on into the sliding motion, the laterally arranged knife-blades of the cutters 10.1 and 10.2 engage the narrow sides of the flat conductor's insulation. This cutting procedure ensures that a "two-dimensional cutting motion" is fully achieved, thanks to the specially designed cutters 10.1 and 10.2, in conjunction with a motion of the two legs 1 and 2 that changes from pressing together to sliding over each other. This permits a uniform cutting around the circumference of the conductor or wire, whose shape might otherwise make stripping difficult.

It is a particular advantage that the user, through both the degree of pressure he exerts and the motion of his hand, and thanks to the intermediate part 4, can control the pressing and sliding motion of the legs 1 and 2, or the sliding and pressing motion, individually and/or as a smooth transfer from one motion to the other, so as to achieve optimal results for the object that is to be stripped.

When the stripping procedure is completed, the spring 7 and the pin 29, running backwards in the slot opening 33, work so that the stripping device in returned to its working position.

Figure 2A:
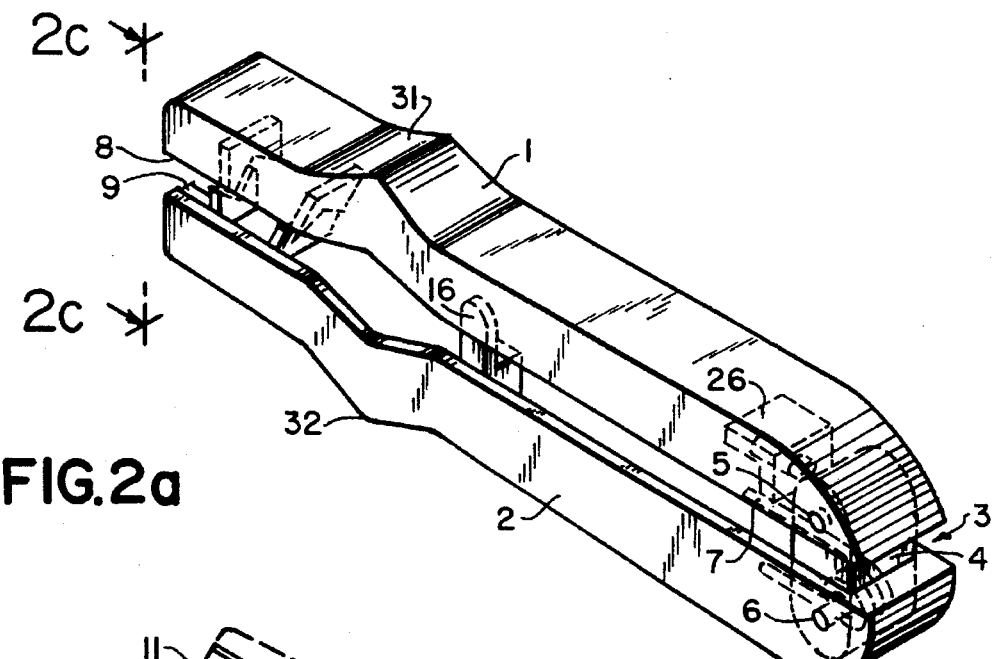
Figure 2B:
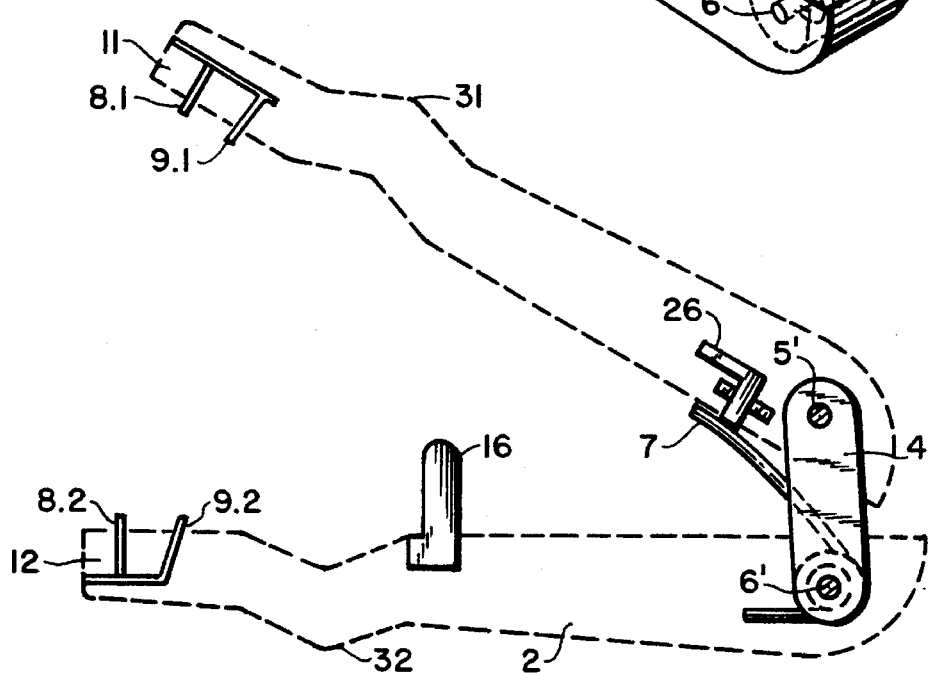
Figure 2C:
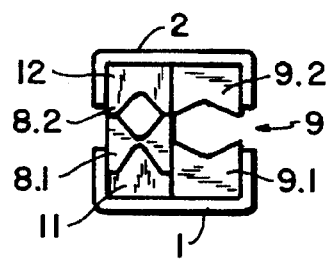

A stripping device for conductors and round wires is shown in FIGS. 2a to 2c.

This stripping device too consists, as FIG. 2a shows, of two legs 1 and 2, connected with each other by a double hinge. In the intermediate part 4, that is held on the legs 1 and 2 in the pivot mountings 5 and 6, a spring is inserted. So that the upper leg 1 will remain open, it strikes with a backstop 26, that can be designed to be adjustable, against the intermediate part 4. The preferred shape for the intermediate part 4 is rectangular.

In the open position as in FIG. 2b, and in FIG. 2c, which shows the working position, it can be seen that a conductor stripping tool 8 with cutters 8.1 and 8.2 lies in the forward area of the legs 1 and 2. In front of the cutter 8.2 lies a triangular gripping jaw 12, projecting backwards, and in front of the cutter 8.1 lies the gripping jaw 11, which has a compatible opening. To the side of this is arranged a de-sheathing tool 9 with its cutters 9.1 and 9.2.

If a conductor is inserted into the stripping tool 8, the process is performed as described above, through a pressing and sliding motion of the two legs 1 and 2, whereby the insulation is cut through and subsequently pulled away, leaving a bare conductor or wire. With this action, a peg 16 runs in a recess 15 provided on the lower leg 3.

If the sheathing of a conductor must be removed, the entire stripping device is inverted through 180°, so that, as shown in FIG. 2c, the leg 2 comes to lie above and the leg 1 below. A conductor is now inserted into the opened tool 9. The raised grips 31 and 32 arranged on the legs 1 and 2, which in this case lie somewhat offset to each other, and the almost perpendicular intermediate part 4 as well as the cutters 9.1 and 8.1, now lying in front of the cutters 9.2 and 8.2 after being turned through 180°, because of the 180° rotation now allow only a cutting motion of the two cutters 9.1 and 9.2, with which, as the stripping device is rotated around the sheathing of the conductor, the sheathing is cleanly cut through and can be removed.

Figure 3C:
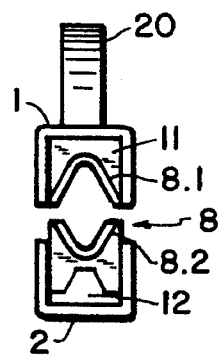

Conductors of larger diameters require the application of greater force for stripping. A possible embodiment of the invention to this end is shown in FIGS. 3a to 3c. It too consists, as FIG. 3a shows, of two legs 1 and 2 lying opposite each other and connected to each other by a double hinge 3, that consists of an intermediate part 4 that swivels in the pivot mountings 5 and 6. The intermediate piece 4 is in this case longer and is mounted at an angle in a pistol-grip-like extension of the lower leg 2. As FIG. 3b in particular makes clear, a lower part 34 of a lever hinge 17 is fastened to the lower leg. A lever element 20 is attached to this hinge on a pivot pin 37. The lever element 20 hooks outwards through a slot 18 made in the leg 1 and touches with its bent surface 21 a cylindrical roller 22 lying at right angles in the opening 18 and inserted into it.

The stripping device, as shown in FIG. 3c, is equipped at the front with a stripping tool 8 and gripping jaws 11 and 12. Just as with the gripping jaws 11 and 12, the cutters 8.1 and 8.2 of the tool 8 are designed to correspond to the cross section of the conductor to be stripped.

A conductor is inserted into this cutting tool 8 and the gripping jaws 11 and 12, which are designed in a similar way to that described above. The oblique positioning of the intermediate piece 4 together with the upper leg 1, now slid forward, produce a greater force on the insulation of the conductor during the cutting motion. This force is further augmented by pushing the lever element 20 forwards with the thumb, so that the curved surface 21 slides along the cylindrical roller. This surface can have a varying curvature, e.g. it can be curved slightly at the beginning and more sharply through the middle to the end, or vice-versa. By varying the curve 21, the force of the lever element 17 in the various phases of motion can be greatly differentiated and controlled at choice.

Figure 4A:
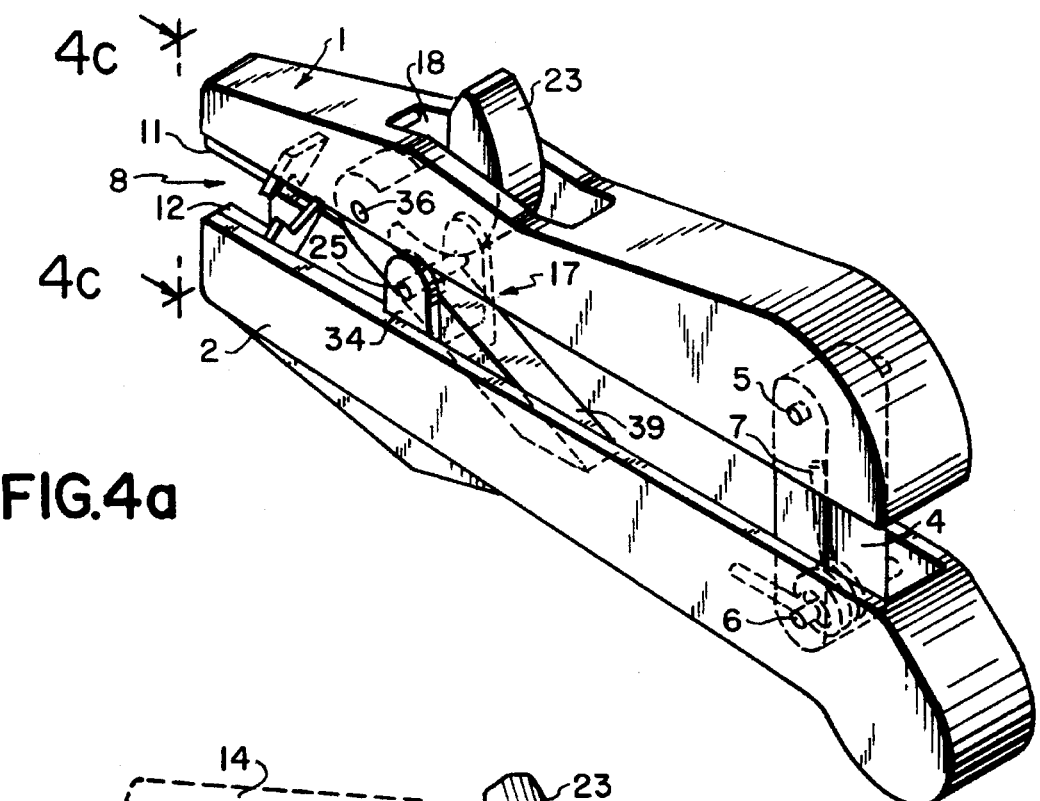
FIG. 4c is a stripping device in accordance with FIG. 4a shown diagrammatically in cross section.
Figure 4B:
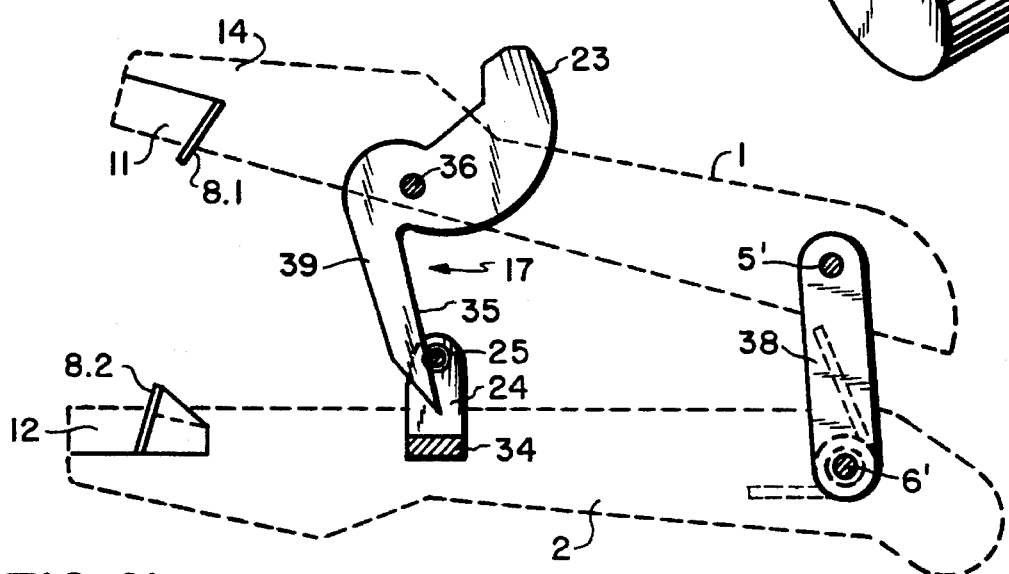
Figure 4C:
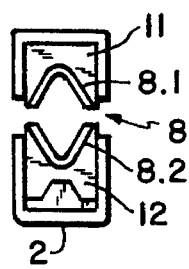
Figure 5:
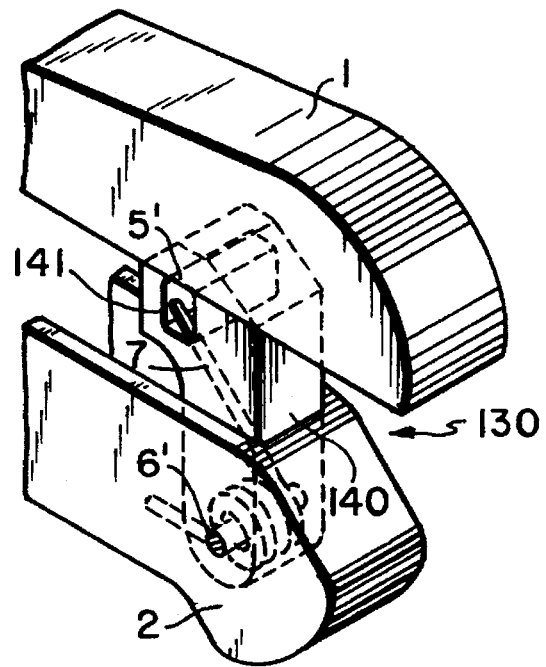
FIG. 5 is a view of an embodiment of another form of the intermediate part.
Figure 6:
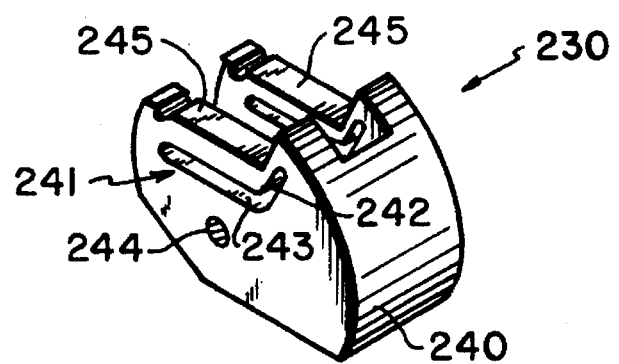
FIG. 6 is a further embodiment of the intermediate part.

A further embodiment of a stripping device with a differently designed lever element 17 is shown in FIGS. 4a and 4b. Here too, two legs 1 and 2 are fastened together by a double hinge 3 consisting of an intermediate part that swivels in the pivot mountings 5 and 6. To make gripping easier, the lower leg 2 is again extended in the manner of a pistol-grip. In contrast to the previous embodiment, the intermediate part 4, restrained by a spring 7, stands almost upright to the lower leg 3, but it too strikes against a backwall 38 serving as a return stop.

On the lower leg 2, a lower piece 34 is inserted with a cylindrical pivot 25. The cylindrical pivot 25 is held by two flat or similarly designed parts of the lower piece so that the roller 25 is freely accessible from all sides. Inside the leg 1 is located a roughly v-shaped lever 23, that is held with a pivot pin 36 in the leg 1. The lever 23 has, as FIG. 4b shows in particular, a straight portion 39 with a running surface 35. This running surface 35 runs against the cylinder pivot 25 when the legs 1 and 2 are pressed together and the lever is activated. The legs 1 and 2 themselves are equipped with cutters 8.1 and 8.2 and with gripping jaws 11 and 12, as was described in detail above. The force applied by activating the lever 23 is determined by the slope of the straight portion 39. The force can also be varied if the running surface 35 is not straight, as shown, but curved, e.g. outwards and/or inwards. When the lever 23 is activated, this serves not only for transmitting the force but also for guiding purposes. Because, specifically, the lever 23 is inserted both in the slot 18 and in the lower piece 34, the two legs are also kept securely parallel to each other in all movements.

The arrangement possibilities of the individual specially designed elements, that are described for the individual stripping devices, are not limited to this one embodiment alone. Indeed it is possible to achieve new embodiments by variations of the individual elements.

I claim:

1. In a device for stripping insulation from wires, said device comprising two legs designed as stripping tools, each leg having at one end at least one swivel pin about which the respective leg can pivot, and having in the area of its other end, at least one cutting tool element; the improvement comprising an intermediate element pivotally connected at spaced points thereof to said swivel pins of said two legs, thereby forming a double hinge, such that when both legs, with their respective cutting tool parts, are held as forceps and are pressed against each other, they slide in contrary motion against each other and their respective cutting tool elements are forced away from each other to strip insulation from a wire.

2. The device according to claim 1, further comprising cutting members of an insulation stripping tool for flat wires mounted on facing inner sides of the respective legs, which cutting members are L-shaped with one cutting member being arranged with respect to the other in opposing cutting relationship.

3. The device according to claim 1, further comprising a hooked extension arranged on one of the legs, and a cutting tool arranged in opposing relationship thereto and guided forwards and backwards with the sliding motion of the two legs.

4. The device according to claim 1, wherein the double hinge is provided with a return biasing element and a return stop element arranged on at least one of the legs.

5. The device according to claim 1, wherein the double hinge is designed as a slotted double hinge with the first swivel pin arranged on one of the legs arranged to slide and rotate in a slot in the intermediate element, and with the second swivel pin rotationally held on the other leg and the intermediate element.

6. The device according to claim 1, wherein the double hinge is designed as a slotted element wherein the two legs are connected by an intermediate element with the first swivel pin arranged on one of the legs and arranged to slide in a groove in the intermediate element.

7. The device according to claim 6, wherein the groove in the intermediate element consists of two obliquely positioned groove portions with differentially steep slopes.

8. The device according to claim 1, further comprising a guide element arranged on one of the legs on the side thereof facing the other leg, which guide element is at the same time a stopping element for the conductor to be inserted in the cutting tool elements.

9. The device according to claim 8, wherein the guide element is designed as at least one peg sliding in at least one longitudinal recess in said one leg.

10. The device according to claim 8, wherein the guide element is designed as a lever hinge that is rotationally connected with said one leg and us guided in a slot in the other leg.

11. The device according to claim 1, further comprising a pivot member attached to one leg and a lever, arranged in the pivot member, having a curved surface that comes into forcible contact with a cylindrical roller arranged in a slot in the other leg during the sliding motion of the two legs.

12. The device according to claim 1, further comprising an essentially v-shaped lever, pivotally held in a slot in one of the legs, said lever engaging forcibly, with an essentially straight portion, a cylindrical pivot rotationally mounted in a socket arranged on the other one of the legs.

13. The device according to claim 1, wherein the intermediate element is arranged at an angle of between 30° and 90° with respect to the longitudinal direction of one of the legs.

14. The device according to claim 1, further comprising a return stop element designed as a cylindrical pivot running in a recessed slot in one of the legs, and an arm holding said return stop element and arranged in the vicinity of one of the pivot points of the swivel pins.

15. The device according to claim 1, further comprising a blade element arranged on a piston bolt that is connected to an arm and is guided by a swivel pin in the piston bolt.

16. The device according to claim 1, further comprising a raised grip disposed on the outer side of at least one of the legs to facilitate movement of the legs with respect to each other.

17. The device according to claim 6, wherein the intermediate element is held rotationally by the second swivel pin on the other leg.

18. The device according to claim 6, wherein the intermediate element is fixed on the other leg.

* * * * *